US007898511B2

(12) United States Patent
Yoo

(10) Patent No.: US 7,898,511 B2
(45) Date of Patent: Mar. 1, 2011

(54) ORGANIC LIGHT EMITTING DIODE DISPLAY AND DRIVING METHOD THEREOF

(75) Inventor: Juhn Suk Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 908 days.

(21) Appl. No.: 11/807,009

(22) Filed: May 26, 2007

(65) Prior Publication Data

US 2008/0174574 A1 Jul. 24, 2008

(30) Foreign Application Priority Data

May 26, 2006 (KR) ...................... 10-2006-0047483

(51) Int. Cl.
*G09G 3/32* (2006.01)
*G09G 3/30* (2006.01)
*G09G 5/00* (2006.01)
*G06F 3/038* (2006.01)

(52) U.S. Cl. ............................ 345/82; 345/76; 345/83; 345/204

(58) Field of Classification Search ............ 345/30–111
See application file for complete search history.

(56) References Cited

U.S. PATENT DOCUMENTS 7,397,448 B2 * 7/2008 Stevenson et al. ............. 345/76
2004/0145547 A1 * 7/2004 Oh .............................. 345/76

* cited by examiner

*Primary Examiner*—Sumati Lefkowitz
*Assistant Examiner*—Charles Hicks
(74) *Attorney, Agent, or Firm*—Brinks Hofer Gilson & Lione

(57) ABSTRACT

An organic light emitting diode display compensates for a threshold voltage of a thin-film driving transistor to improve display quality. The display includes a light emitting cell connected between a high-level voltage source and a first node. A driving transistor is connected between the first node and a ground voltage source to control a current, which flows in the light emitting cell, by using a voltage applied to a gate terminal of the driving transistor. A data driving circuit applies a data voltage of first polarity to the gate terminal of the driving transistor to shift a threshold voltage of the driving transistor from a reference value to the voltage of first polarity. A compensation circuit supplies a compensation voltage of second polarity to the gate terminal of the driving transistor to shift the threshold voltage of the driving transistor from the voltage of first polarity to the voltage of second polarity, and then supplies a constant current to the gate terminal of the driving transistor to restore the threshold voltage of the driving transistor to the reference value.

11 Claims, 13 Drawing Sheets

ORGANIC LIGHT EMITTING DIODE DISPLAY AND DRIVING METHOD THEREOF

This application claims the benefit of Korean Patent Application No. P2006-047483, filed May 26, 2006, which is hereby incorporated by reference.

BACKGROUND

1. Field of the Invention

The present invention relates to an organic light emitting diode display and a driving method thereof, and more particularly to an organic light emitting diode display that is adapted to compensate a threshold voltage of a driving thin film transistor to improve a display quality.

2. Description of the Related Art

Recently, various flat panel displays have been developed having reduced weight and bulk, which eliminates the disadvantages of cathode ray tubes. Such flat panel display devices include liquid crystal displays (LCD), field emission displays (FED), plasma display panels (PDP), and electro-luminescence devices (EL), etc.

The PDP has an advantage of having a thin profile and light weight, and is suitable for making large screens because of its simple structure and a simple manufacturing process. However, the PDP has a disadvantage of low luminous efficiency, low brightness levels, and high power consumption. Furthermore, since an active matrix LCD having thin film transistors (TFT) is formed by a semiconductor process, it is difficult to manufacture a large size screen. The active matrix LCD has a disadvantage of high power consumption, as it uses a backlight unit as a light source.

The EL device is classified into an inorganic light emitting diode display and an organic light emitting diode display, depending upon a material of the light emitting layer. The EL device is a self-luminous device. The EL device has an advantage of fast response time, high luminous efficiency, high brightness levels, and a wide viewing angle. The inorganic light emitting diode display has high power consumption and cannot provide the high brightness levels compared to the organic light emitting diode display, and cannot emit a variety of colors using an R color, a G color, and a B color. On the other hand, the organic light emitting diode display is driven at low DC voltage levels, has a fast response time, and provides high brightness levels. As a result, the organic light emitting diode display can emit a variety of colors using an R color, a G color, and a B color, and is well-suited for the next generation of flat panel displays.

Referring to FIG. 1, if a voltage is applied between a first electrode 100 and a second electrode 70 of the organic light emitting diode display, an electron generated from the second electrode 70 moves toward an organic light emitting layer 78*c* via an electron injection layer 78*a* and an electron transport layer 78*b*. Further, a hole generated from the first electrode 100 moves forward in the light emitting layer 78*c* via a hole injection layer 78*e* and a hole transport layer 78*d*. The electron supplied from the electron transport layer 78*b* and the hole supplied from the hole transport layer 78*d* collide with each other in the light emitting layer 78*c* and recombine to generate light. The light is then emitted to the exterior via the first electrode 100 so as to display an image.

FIG. 2 is a block diagram schematically showing an organic light emitting diode display of the related art. Referring to FIG. 2, the organic light emitting diode display of the related art includes an OLED panel 20, a gate driving circuit 22, a data driving circuit 24, a gamma voltage generator 26, and a timing controller 27. The OLED panel 20 has pixels 28 arranged at the intersection of the gate lines GL and data lines DL. The gate driving circuit 22 drives the gate lines GL of the OLED panel 20. The data driving circuit 24 drives the data lines DL of the OLED panel 20. The gamma voltage generator 26 supplies a plurality of gamma voltages to the data driving circuit 24. The timing controller 27 controls the data driving circuit 24 and the gate driving circuit 22.

The pixels 28 are arranged in a matrix on the OLED panel 20. A supply pad 10 and a ground pad 12 are formed on the OLED panel 20. The supply pad 10 receives a high-level voltage supplied from the external high-level voltage source VDD. The ground pad 12 receives a ground voltage supplied from the external ground voltage source GND. For example, the high-level power voltage source VDD and the ground voltage source GND may be supplied from a power supply. The high-level voltage supplied to the supply pad 10 is supplied to each of the pixels 28. Also, the ground voltage supplied to the ground pad 12 is supplied to each of the pixels 28.

The gate driving circuit 22 supplies a gate signal to the gate lines GL to sequentially drive the gate lines GL. The gamma voltage generator 26 supplies a gamma voltage having a variety of voltage values to the data driving circuit 24.

The data driving circuit 24 converts a digital data signal, which is inputted from the timing controller 27, into an analog data signal using a gamma voltage from the gamma voltage generator 26. Furthermore, the data driving circuit 24 supplies an analog data signal to the data lines DL when a gate signal is supplied.

The timing controller 27 generates a data control signal that controls the data driving circuit 24 and a gate control signal that controls the gate driving circuit 22 using a plurality of synchronization signals. A data control signal, which is generated from the timing controller 27, is supplied to the data driving circuit 24 to control the data driving circuit 24. A gate control signal, which is generated from the timing controller 27, is supplied to the gate driving circuit 22 to control the gate driving circuit 22. The timing controller 27 supplies a digital data signal, which is supplied from a scaler (not shown), to the data driving circuit 24.

Each of the pixels 28 receives a data signal from the data line DL to generate light corresponding to the data signal when a gate signal is supplied to the gate line GL. To this end, each of the pixels 28 includes a light emitting cell OEL and a cell driving circuit 30, as shown in FIG. 3. The light emitting cell OEL has a cathode, which is connected to a ground voltage source GND, that is, a voltage which is supplied from the ground pad 12. The cell driving circuit 30 is connected to the data line DL and a high-level voltage source VDD (a voltage which is supplied from the supply pad 10), and is connected to an anode of the light emitting cell OEL to drive the light emitting cell OEL.

The cell driving circuit 30 includes a switching TFT T1, a driving TFT T2, and a capacitor C. The switching TFT T1 has a gate terminal which is connected to the gate line GL, a source terminal which is connected to the data line DL, and a drain terminal which is connected to a node N. The driving TFT T2 has a gate terminal which is connected to a node N, a source terminal which is connected to a high-level voltage source VDD, and a drain terminal which is connected to a light emitting cell OEL. The storage capacitor C is connected between a high-level voltage source VDD and the node N.

If a gate signal is supplied to the gate line GL, the switching TFT T1 is turned-on to supply a data signal from the data line DL to the node N. The data signal supplied to the node N charges the storage capacitor C and is supplied to a gate terminal of the driving TFT T2. The driving TFT T2 controls an amount of current I, which is supplied from a high-level voltage source VDD to the light emitting cell OEL in response to a data signal supplied to its gate terminal, to control an amount of light emitted from the light emitting cell OEL. Furthermore, although the switching TFT T1 is turned-off, a data signal is discharged from the storage capacitor C. As a result, the driving TFT T2 can supply a current I from the high-level voltage source VDD to the light emitting cell OEL to allow a light emitting cell OEL to emit light until a data signal of a next frame is supplied. Herein, the cell driving circuit 30 may be set in a variety of structures other than the above-mentioned structure.

However, in the organic light emitting diode display apparatus which is driven in this manner, if a gate voltage having the same polarity is applied for a long time, a threshold voltage Vth of the driving TFT T2 is raised, thereby changing an operating characteristic of the driving TFT T2. A change of operating characteristics of such a driving TFT T2 is shown by the experimental results in FIG. 4.

FIG. 4 show experimental results where characteristics of a hydrogenated amorphous silicon TFT a-Si:H TFT of a test sample is changed when a positive gate-bias stress is applied to a hydrogenated amorphous silicon TFT for a test sample a-Si:H TFT having a channel width to channel length ratio W/L of about 120 μm/6 μm. The x-axis represents a gate voltage V, and the y-axis represents a current between a source terminal and a drain terminal of a hydrogenated amorphous silicon TFT a-Si:H TFT for a test sample. Each curve represents operating characteristics of a hydrogenated amorphous silicon TFT a-Si:H TFT, where a gate voltage applying time is increased from left to right.

FIG. 4 shows shifting of a threshold voltage of a TFT and an operating characteristics curve according to a voltage applying time when a voltage of about +30V is applied to a gate terminal of a hydrogenated amorphous silicon TFT a-Si:H TFT. If the time that a high voltage of positive polarity is applied to a gate terminal of a hydrogenated amorphous silicon TFT a-Si:H TFT is increased, the operating characteristics curve of the TFT moves to the right, and a threshold voltage of the hydrogenated amorphous silicon TFT a-Si:H TFT is increased (a threshold voltage is increased from $Vth_1$ to $Vth_4$).

As described above, if a threshold voltage of the driving TFT T2 is increased, the TFT T2 becomes unstable. Thus, it is difficult for the organic light emitting diode display to be normally driven. To solve this problem, the organic light emitting diode display of the related art provides a compensation method, which increases a gate voltage of the driving TFT T2 in proportion to the increased threshold voltage to allow an arbitrary current to flow through a source and drain terminals of the driving TFT T2.

However, the organic light emitting diode display of the related art, which provides such a compensation method, continuously increases a gate voltage in proportion to an increase of a threshold voltage of the driving TFT T2, thereby degrading performance of the driving TFT T2. Accordingly, in the organic light emitting diode display of the related art, a threshold voltage of the driving TFT T2 is further increased, so that a degradation of the driving TFT T2 is accelerated. As a result, the display quality of the organic light emitting diode display deteriorates and the life span is decreased.

SUMMARY

An organic light emitting diode display includes a light emitting cell connected between a high-level voltage source and a first node, and a driving transistor connected between the first node and a ground voltage source to control a current flow in the light emitting cell, by using a voltage applied to a gate terminal of the driving transistor. A data driving circuit applies a data voltage of first polarity to the gate terminal of the driving transistor to shift a threshold voltage of the driving transistor from a reference value to the voltage of first polarity. A compensation circuit supplies a compensation voltage of second polarity, which is different from the first polarity, to the gate terminal of the driving transistor to shift the threshold voltage of the driving transistor from the voltage of first polarity to the voltage of second polarity. The compensation circuit then supplies a constant current to the gate terminal of the driving transistor to restore the threshold voltage of the driving transistor to the reference value

BRIEF DESCRIPTION OF THE DRAWINGS

The invention will be apparent from the following detailed description of the embodiments of the present invention with reference to the accompanying drawings, in which.

DETAILED DESCRIPTION

Figure 5:
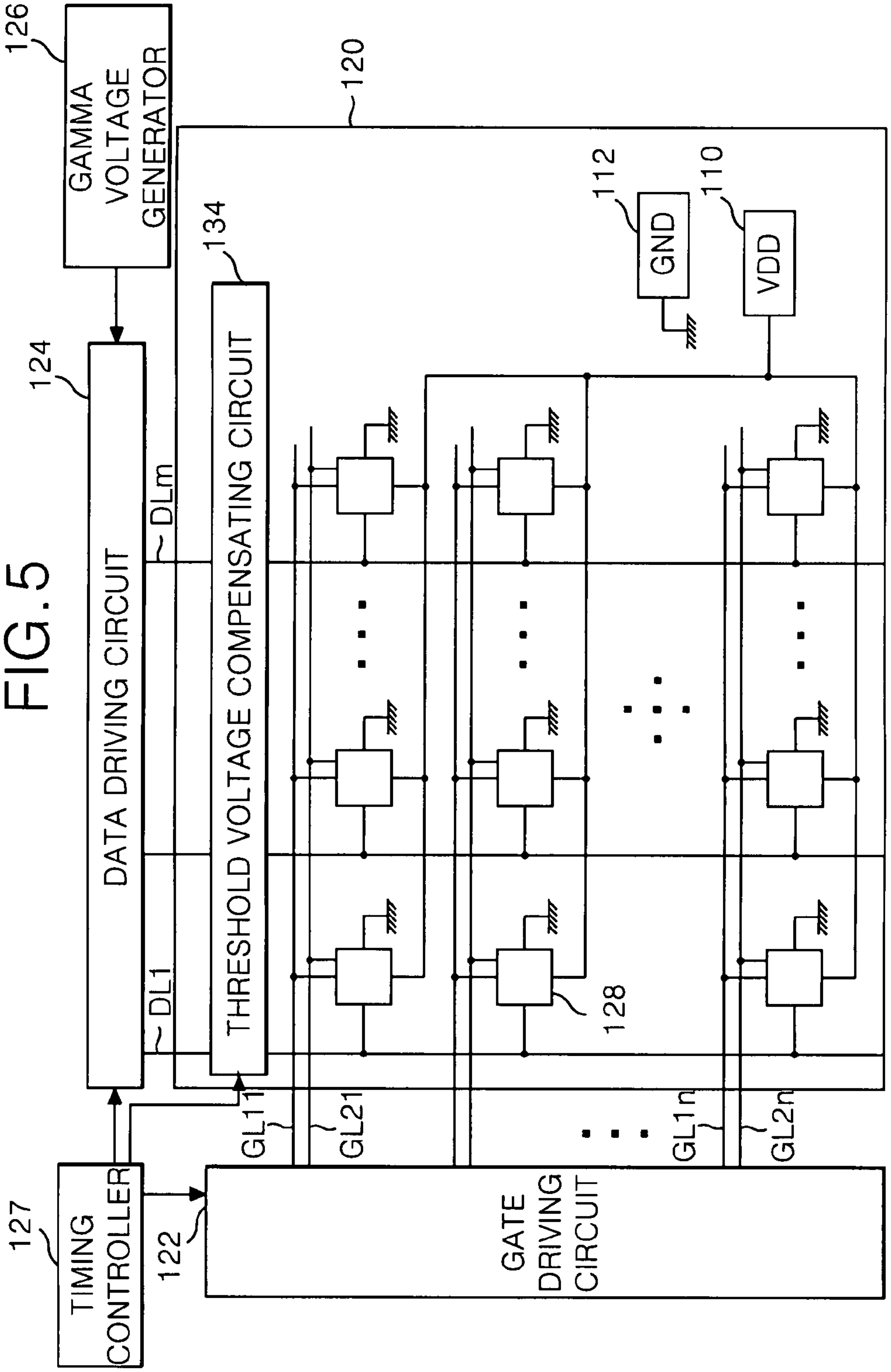
FIG. 5 is a block diagram schematically showing an organic light emitting diode display according to an embodiment.
Figure 6:
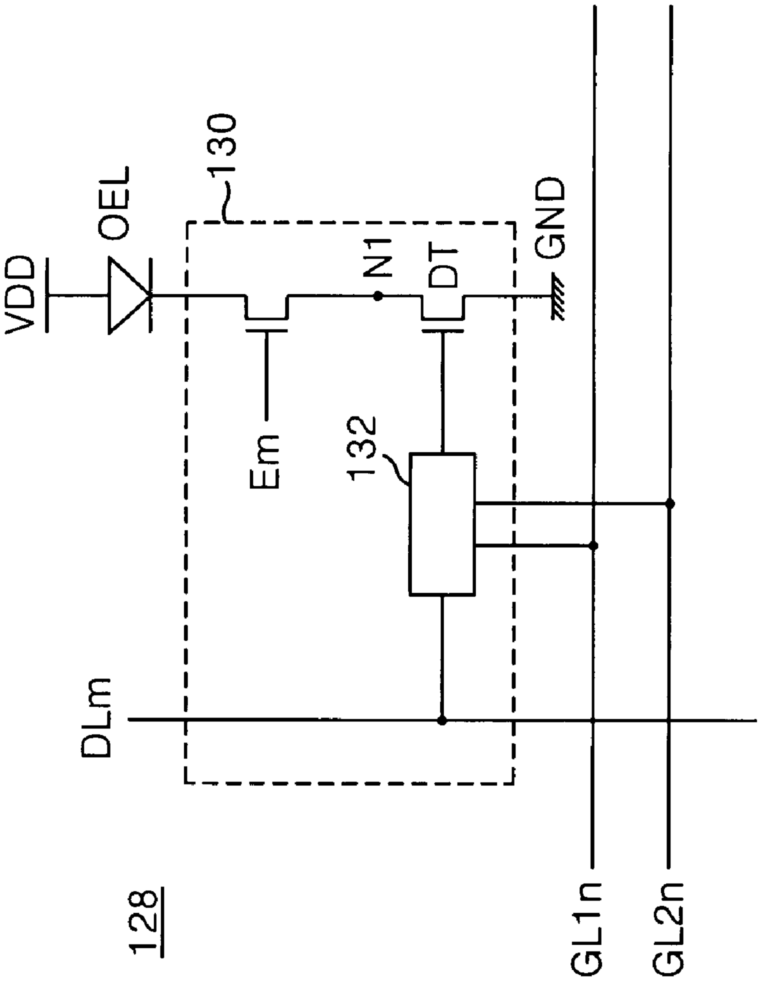
FIG. 6 is a circuit diagram showing a pixel in FIG. 5.

FIG. 5 is a block diagram schematically showing an organic light emitting diode display, and FIG. 6 is a circuit diagram showing a pixel in FIG. 5. Referring to FIG. 5, an organic light emitting diode display includes an OLED panel 120, a gate driving circuit 122, a data driving circuit 124, a gamma voltage generator 126, a threshold voltage compensating circuit 134, and a timing controller 127. The OLED panel 120 has pixels 128, each of which is arranged at an intersection of two gate lines GL1*n* and GLn2 and one data line DLm. The gate driving circuit 122 supplies gate signals to the gate lines GL11 to GL1*n*, and GL21 to GL2*n* of the OLED panel 120. The data driving circuit 24 supplies data signals to the data lines DL1 to DLm of the OLED panel 120. The gamma voltage generator 126 supplies a plurality of gamma voltages to the data driving circuit 124. The threshold voltage compensating circuit 134 is connected to the data lines DL1 to DLm to maintain a threshold voltage of a driving TFT, which is included at each of the pixels 128. The timing controller 127 controls the data driving circuit 124, the gate driving circuit 122, and the threshold voltage compensating circuit 134.

The pixels 128 are arranged in a matrix on the OLED panel 120. A supply pad 110 and a ground pad 112 are formed on the OLED panel 120. To the supply pad 110, a high-level power voltage is supplied from the external high-level power voltage source VDD. A ground voltage is supplied from the external ground voltage source GND to the ground pad. The high-level voltage source VDD and the ground voltage source GND may be supplied from a power supply. A high-level voltage supplied to the supply pad 110 is supplied to each of the pixels 128. Also, a ground voltage supplied to the ground pad 112 is supplied to each of the pixels 128.

The gate driving circuit 122 supplies a first gate signal and a second gate signal to the gate lines GL11 to GL1*n*, and GL21 to GL2*n*, to sequentially drive the gate lines GL11 to GL1*n*, and GL21 to GL2*n*. The gamma voltage generator 126 supplies a plurality of gamma voltages having different voltage values to the data driving circuit 124.

The data driving circuit 124 converts a digital data signal, which is inputted from the timing controller 127, into an analog data signal using a gamma voltage from the gamma voltage generator 126. The data driving circuit 124 supplies an analog data signal to the data lines DL whenever a first gate signal is supplied.

The timing controller 127 generates a data control signal that controls the data driving circuit 124, a gate control signal that controls the gate driving circuit 122, and a threshold voltage control signal that controls the threshold voltage compensating circuit 134 using a plurality of synchronization signals. The timing controller 127 supplies a digital data signal, which is supplied from a scaler (not shown), to the data driving circuit 124. A data control signal, which is generated from the timing controller 127, is supplied to the data driving circuit 124 to control the data driving circuit 124. A gate control signal, which is generated from the timing controller 127, is supplied to the gate driving circuit 122 to control the gate driving circuit 122. A threshold voltage control signal, which is generated from the timing controller 127, is supplied to the threshold voltage compensating circuit 134 to control the threshold voltage compensating circuit 134.

Each of the pixels 128 is equivalently represented as a diode between the data line DLm and the gate lines GL1*n* and GL2*n*. Each of the pixels 128 receives an analog data signal from the data line DL and generates light corresponding to the data signal when a gate signal is supplied to the gate line GL1*n* and GL2*n*. To this end, each of the pixels 128 includes a high-level voltage source VDD, a light emitting cell OEL, which is connected between the high-level power voltage source VDD and a ground voltage source GND, and a cell driving circuit 130 that drives the light emitting cell OEL in accordance with driving signals which are supplied from the data line DLm and the gate lines GL1*n* and GL2*n*, as shown in FIG. 6.

The light emitting cell driving circuit 130 includes a driving TFT DT and an Em TFT ET, which are connected in series between the ground voltage source GND and the light emitting cell OEL, and a driving controlling circuit 132 that is connected to the gate lines GL1*n* and GL2*n* and the data line DLm, to control the driving TFT DT. The driving TFT DT controls an amount of current supplied from the high-level voltage source VDD to the light emitting cell OEL in response to a data signal which is supplied to its gate terminal to adjust an amount of a light emitted from the light emitting cell OEL. The Em TFT ET disconnects the light emitting cell OEL from the driving TFT DT during a process of compensating a threshold voltage of the driving TFT DT by using the threshold voltage compensating circuit 134.

The driving controlling circuit 132 controls driving of the driving TFT DT. The driving controlling circuit 132 can be classified into a voltage driving type and a current driving type. In case of the voltage driving type, the driving TFT DT controls an amount of current, which is supplied from a high-level voltage source VDD to a light emitting cell OEL in response to an analog data signal, which is supplied to its gate terminal in accordance with a control of the driving controlling circuit 132, thereby adjusting an amount of light emitted by the light emitting cell OEL.

In contrast, with the current driving type, the driving TFT DT forms a current mirror together with the driving controlling circuit 132 and controls an amount of current, which is supplied from the high-level voltage source VDD to a light emitting cell OEL in accordance with an amount of current that flows in the driving controlling circuit 132, thereby adjusting an amount of light emitted by the light emitting cell OEL. The driving controlling circuit 132 may be implemented in a variety of structures other than the above-mentioned structure.

Figure 7:
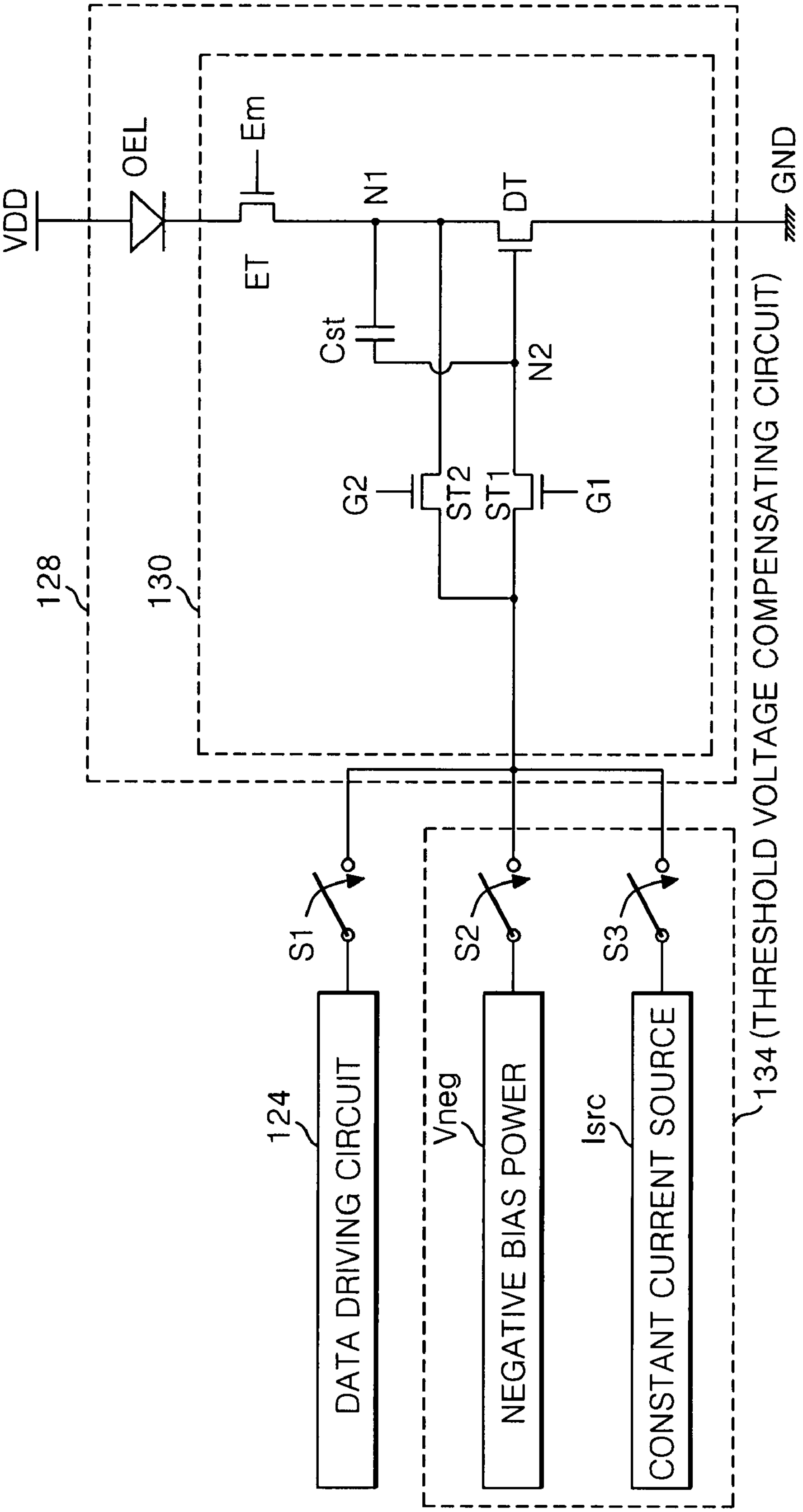
FIG. 7 is a circuit diagram of an organic light emitting diode display that compensates a threshold voltage of a driving TFT to drive a pixel according to an embodiment.
Figure 8:
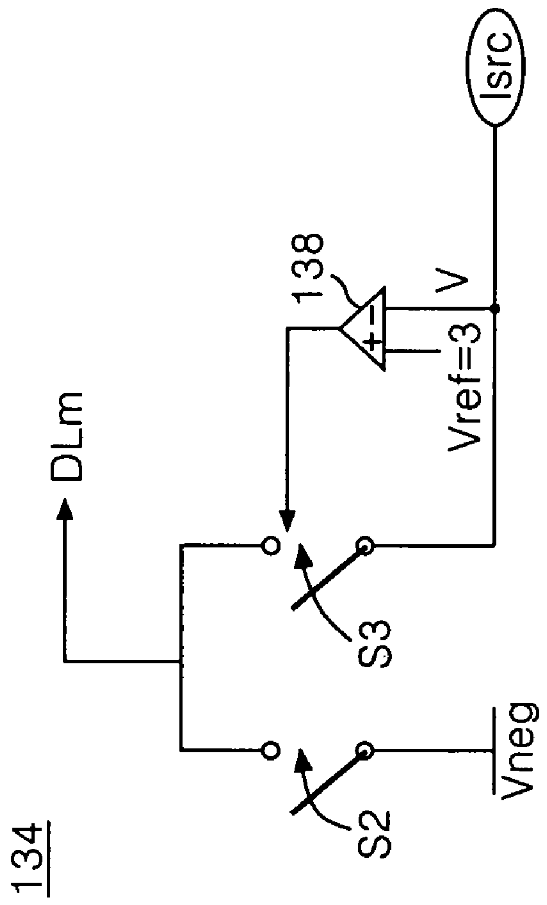
FIG. 8 is a detailed circuit diagram showing the threshold voltage compensating circuit in FIG. 7.

FIG. 7 is a circuit diagram of an organic light emitting diode display that compensates a threshold voltage of a driving TFT to drive a pixel. FIG. 8 is a circuit diagram showing in detail the threshold voltage compensating circuit in FIG. 7, and FIG. 9 is a timing diagram for output signals shown in FIG. 7 and FIG. 8.

Referring to FIG. 7, an organic light emitting diode display includes the pixels 128, the data driving circuit 124, and the threshold voltage compensating circuit 134. Each of the pixels 128 is arranged at an intersection of the gate lines GL1*n* and GL2*n* and the data line DLm. The data driving circuit 124 supplies an analog data signal to the pixels 128. The threshold voltage compensating circuit 134 compensates a threshold voltage of a driving TFT of each of the pixels 128. Each of the pixels 128 includes a light emitting cell OEL having an anode electrode that is connected to a high-level voltage source VDD.

A cell driving circuit 130 is connected to gate lines G1 and G2, the data line DL, the ground voltage source GND, and a cathode electrode of the light emitting cell OEL. The cell driving circuit 130 includes first and second switching TFTs ST1 and ST2, a driving TFT DT, and an Em TFT ET. The first and second switching TFTs ST1 and ST2, the driving TFT DT, and the Em TFT ET may be formed by N type MOSFETs.

Figure 9:
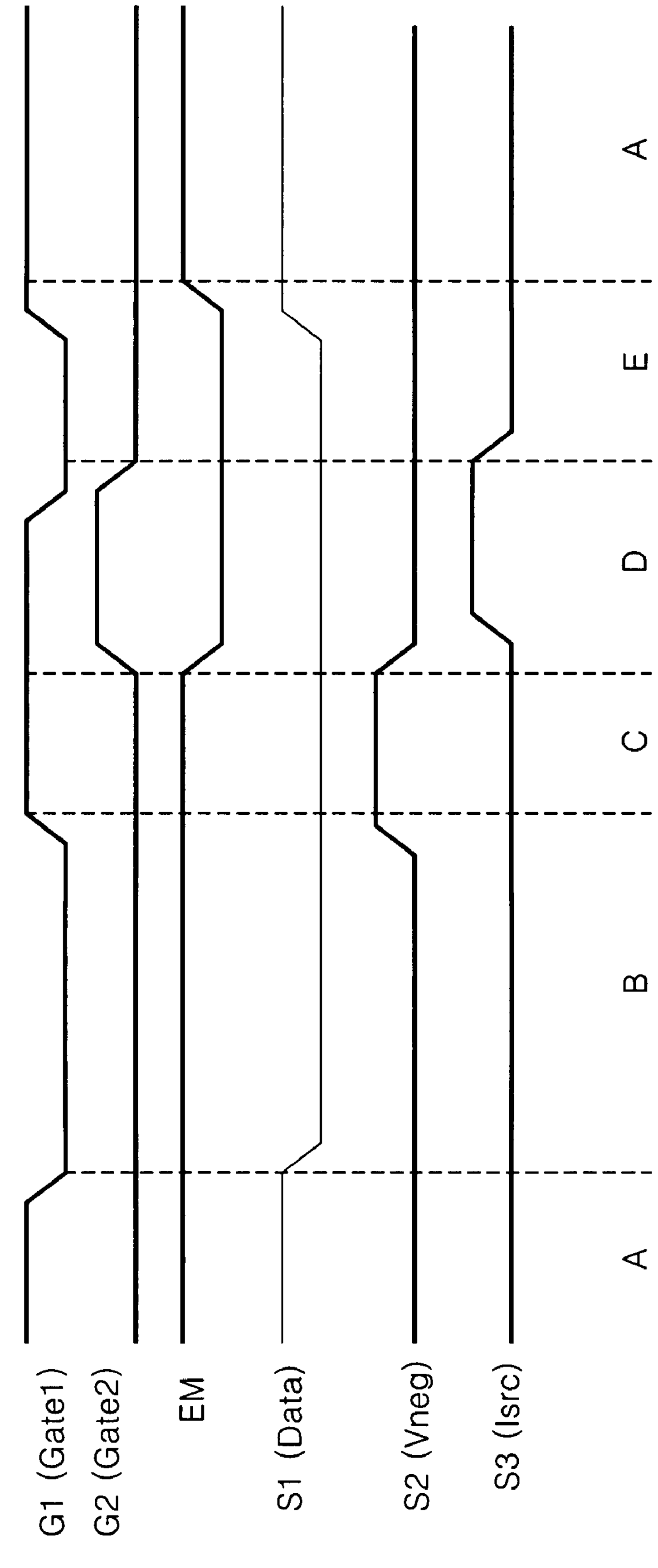
FIG. 9 is a timing diagram for output signals shown in FIG. 7 and FIG. 8.

Referring to FIG. 9, if a high state gate signal G1 is supplied to the gate line GL1*n*, the first switching TFT ST1 is turned-on to supply an analog data signal from the data line DLm to a first node N1. The data signal supplied to the first node N1 charges the storage capacitor Cst and also is supplied to a gate terminal of the driving TFT DT. The driving TFT DT controls an amount of current that is supplied from the high-level voltage source VDD to the light emitting cell OEL, in response to the analog data signal supplied to its gate terminal, thereby adjusting an amount of light emitted by the light emitting cell OEL. Furthermore, although the gate signal G1 is inverted to a low state so that the first switching TFT ST1 is turned-off, a data signal charged at the storage capacitor Cst is discharged. Thus, the driving TFT DT supplies a current from the high-level voltage source VDD to the light emitting cell OEL to allow the light emitting cell OEL to emit light, until a data signal of a next frame is supplied.

Figure 1:
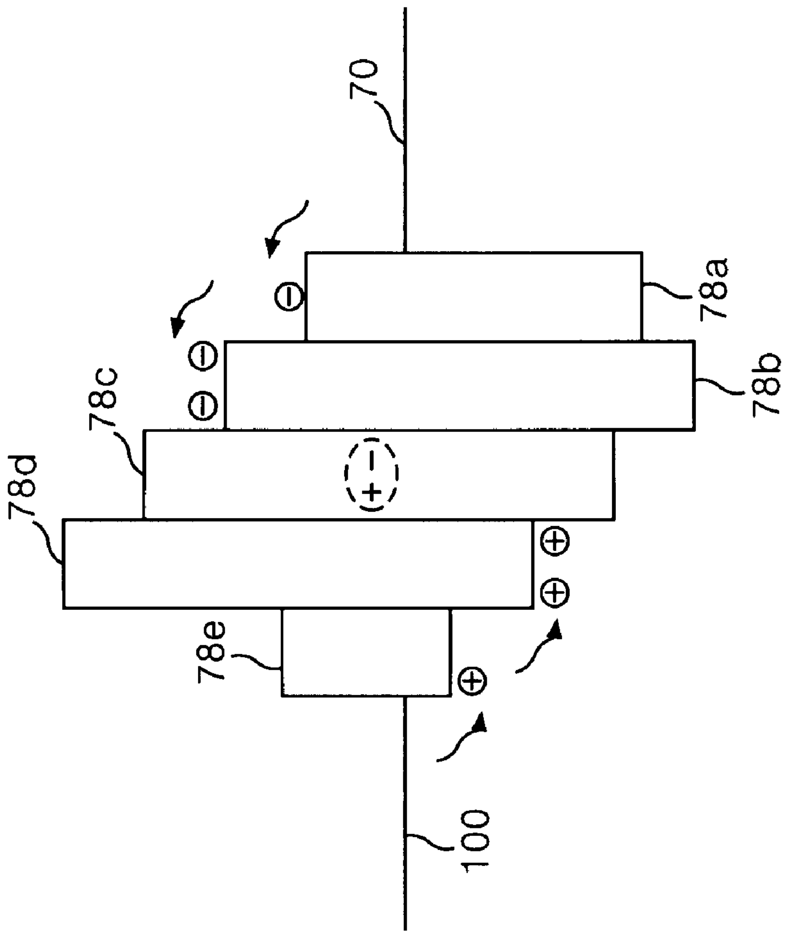
FIG. 1 RELATED ART
FIG. 1 is a pictorial diagram showing an emitting principle of an organic light emitting diode display of the related art.
Figure 2:
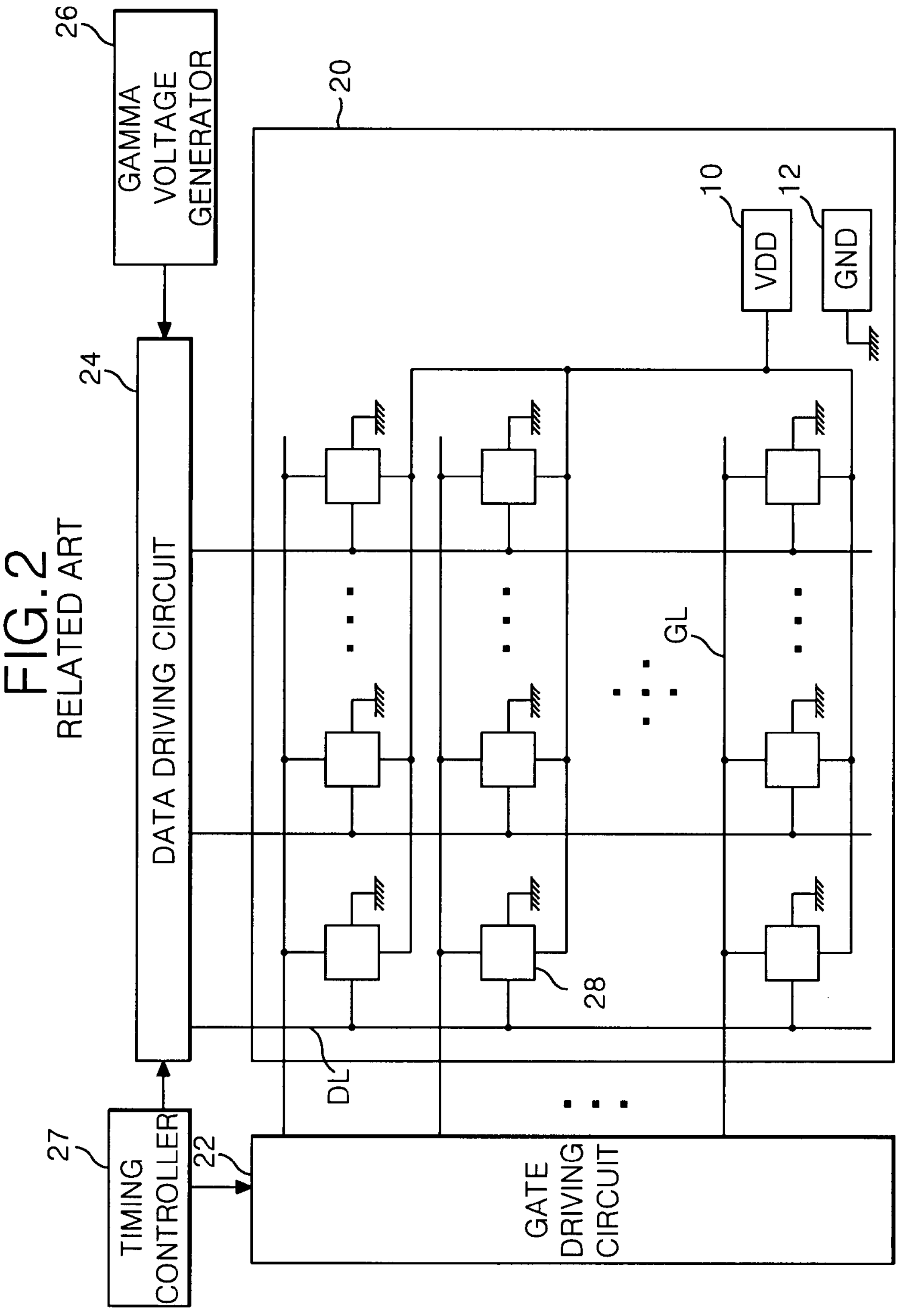
FIG. 2 RELATED ART
FIG. 2 is a block diagram schematically showing an organic light emitting diode display of the related art.
Figure 3:
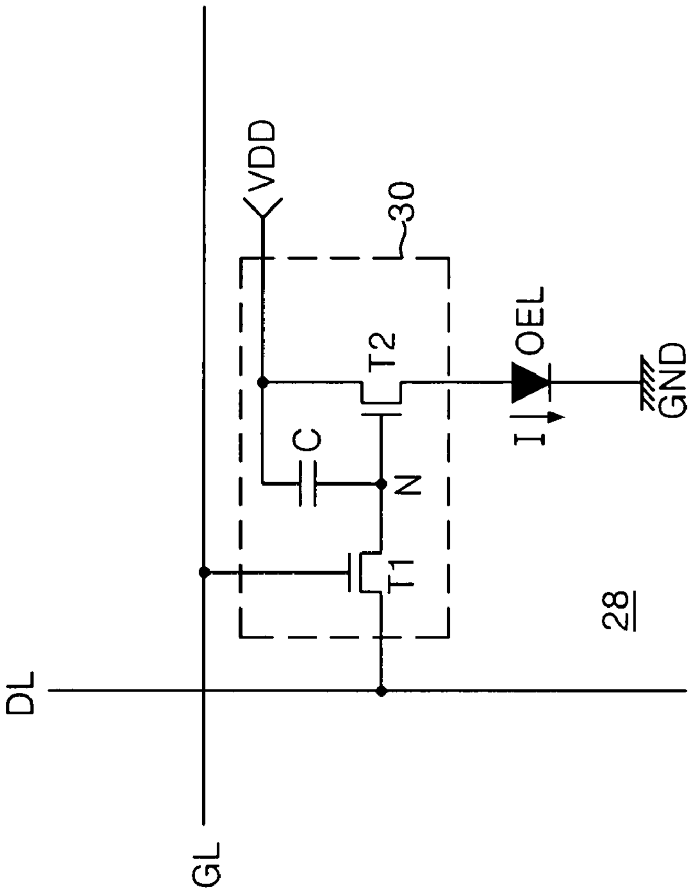
FIG. 3 RELATED ART
FIG. 3 is a detailed circuit diagram showing the pixel in FIG. 2.
Figure 4:
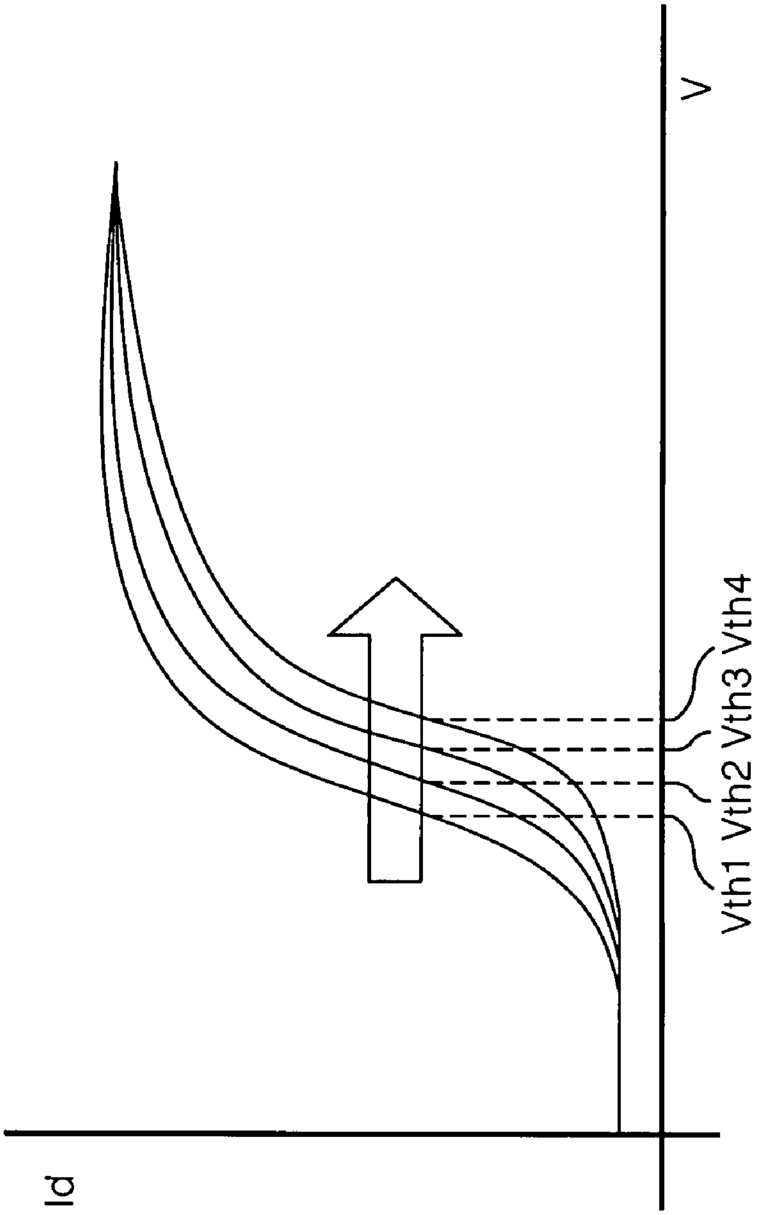
FIG. 4 RELATED ART
FIG. 4 is a diagram showing a threshold voltage of a driving TFT increased by a positive gate-bias stress.

Referring to FIG. 9, if a high state gate signal G2 is supplied to the gate line GL2*n*, the second switching TFT ST2 is turned-on to short-circuit a drain terminal with a gate terminal of the driving TFT DT to increase a gate voltage and a drain voltage simultaneously when a constant current is applied by a constant current source Isrc. The Emission (Em) TFT ET includes a drain connected to a cathode of the light emitting cell OEL, and a source commonly connected to the storage capacitor Cst, the second switching TFT ST2, and the driving TFT DT. The Em TFT ET is turned-on or turned-off in accordance with an Em control signal EM to control a current flowing from the high-level voltage source VDD to the ground voltage source GND via the light emitting cell OEL, as shown in FIG. 9. The data driving circuit supplies an analog data voltage to a gate terminal of the driving TFT DT in accordance with a data signal S1. Accordingly, a threshold of the driving TFT DT is increased by a positive gate-bias stress, as described in FIG. 4.

The threshold voltage compensating circuit 134 includes a negative bias voltage source Vneg and a constant current source Isrc. The negative bias voltage source Vneg supplies a negative bias to a gate terminal of the driving TFT DT in accordance with a negative bias applying signal S2. The constant current source Isrc supplies a constant current to a gate terminal of the driving TFT DT in accordance with a constant current applying signal S3. The threshold voltage compensating circuit 134 supplies a negative bias to a gate terminal of the driving TFT DT for a "C" interval to drop a threshold voltage of the driving TFT DT to less than a predetermined initial value, as shown in FIG. 9. Furthermore, the threshold voltage compensating circuit 134 supplies a constant current to the gate terminal of the driving TFT DT for a "D" interval to boost a threshold voltage of the driving TFT DT, which is dropped under the initial value during the "C" interval, to the predetermined initial value as shown in FIG. 8 and FIG. 9.

A comparator 138 compares a threshold voltage (inputted into a negative terminal) of the driving TFT DT, which is increased according to an input constant current with a predetermined initial value (inputted into a positive terminal) with respect to a threshold voltage of the driving TFT DT, to control a supply of a constant current. To this end, the constant current applying signal S3 is maintained as a high-level for the "D" interval until a compared threshold voltage of the driving TFT DT becomes equal to the predetermined initial value. In this way, the organic light emitting diode display periodically applies biases Vneg and Isrc via the threshold voltage compensating circuit 134 to constantly maintain a threshold voltage of the driving TFT DT.

Figure 10:
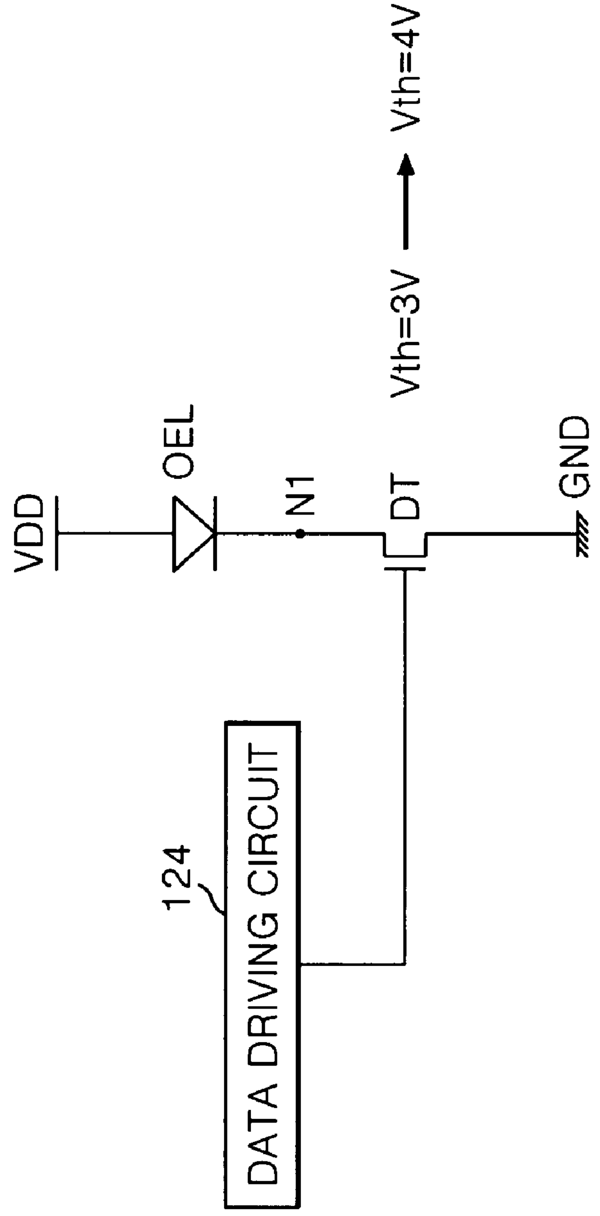
FIG. 10 to FIG. 12 are equivalent circuit diagrams for explaining a method of driving the organic light emitting diode display according to an embodiment.
Figure 11:
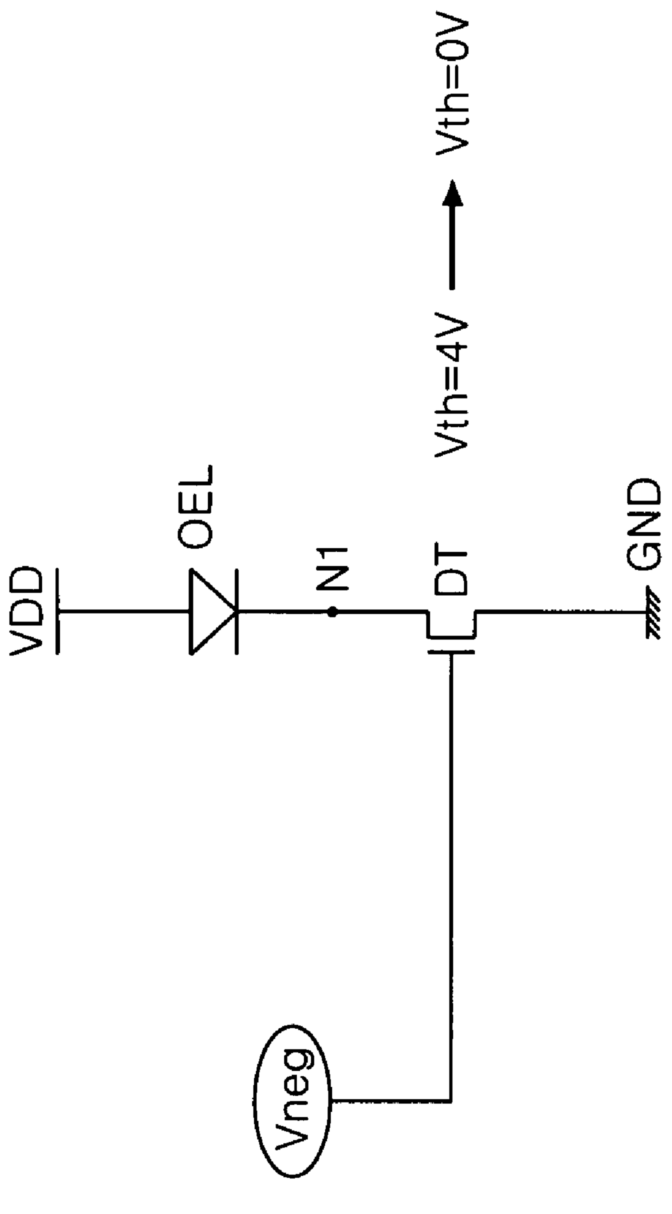
Figure 12:
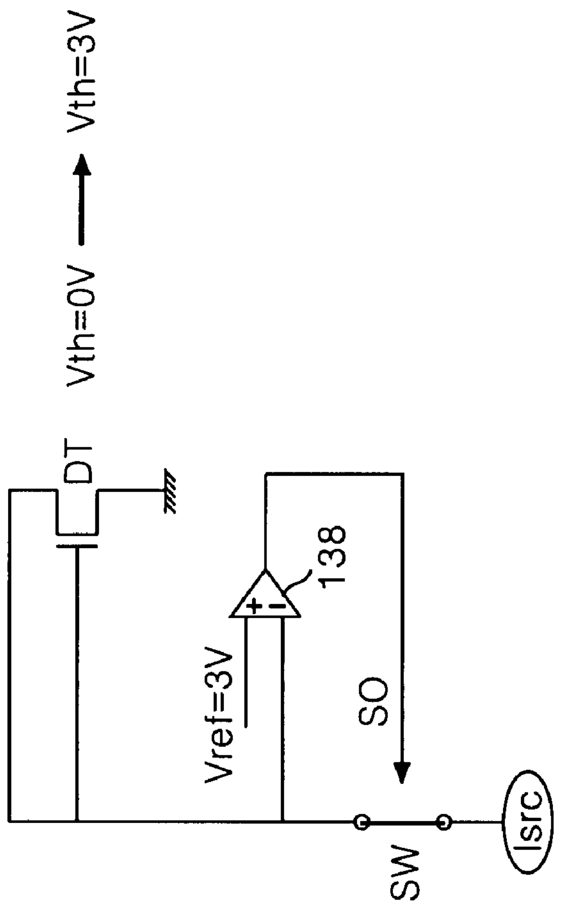

FIG. 10 to FIG. 12 are equivalent circuit diagrams for explaining a method of driving the organic light emitting diode display. An "A" interval of FIG. 9 defines a normal driving state, that is, an interval that the organic light emitting diode display emits light, which is represented by an equivalent circuit in FIG. 10. As shown in FIG. 10, a threshold voltage Vth of the driving TFT DT is increased by a positive gate-bias stress, which is generated by a positive bias voltage. For example, in a driving TFT DT having a predetermined initial threshold voltage Vref of 3V, a value of the threshold voltage Vth is increased to 4V due to the positive bias voltage A "C" interval of FIG. 9 is an interval that a negative bias voltage is applied, which is represented by an equivalent circuit in FIG. 11. In the "C" interval, the data signal S1 is maintained at a low state, and a negative bias signal S2 is inverted to a high state. As shown in FIG. 11, the increased threshold voltage Vth of the driving TFT DT is decreased by a negative gate-bias stress, which is generated by an applied negative bias voltage Vneg. For example, in a driving TFT DT having a predetermined initial threshold voltage Vref of about 3V, a value of threshold voltage Vth is decreased to about 0V due to the negative bias voltage Vneg. The applied negative bias voltage Vneg sufficiently decreases a threshold voltage Vth of the driving TFT DT to less than a predetermined initial value of about 3V for the "C" interval. A specific level of negative bias voltage Vneg may be determined experimentally. However, it is desirable that a level of the negative bias voltage Vneg is less than about −10V.

A "D" interval of FIG. 9 is an interval that a constant current is applied to a gate terminal of the driving TFT DT, which is represented by an equivalent circuit in FIG. 12. In the "D" interval, the constant current applying signal S3 and the second gate signal G2 are inverted to a high state, and an Em signal is inverted to a low state. The data signal S1 is maintained at a low state, and a negative bias signal is inverted to a low state. As shown in FIG. 12, a threshold voltage Vth, which was decreased under the predetermined initial value Vref of the driving TFT DT, is increased again by an applied constant current. In this case, a threshold voltage is supplied to a negative terminal of the comparator 138. The threshold voltage Vth of the driving TFT DT is increased by a constant current supplied from the constant current source Isrc to the gate terminal of the driving TFT DT. Then, the comparator 138 compares the threshold voltage Vth of the driving TFT DT with a predetermined initial value Vref, which is supplied to a positive terminal, to control a supply of constant current in accordance with the compared result. In other words, if a compared threshold voltage Vth is lower than the predetermined initial value Vref, the comparator 138 controls a switch SW using an output signal S0 to continuously supply a constant current to the gate terminal of the driving TFT DT from the constant current source Isrc. If a compared threshold voltage Vth becomes equal to the predetermined initial value Vref, the comparator 138 controls a switch SW using an output signal S0 to cut-off the constant current, which is being supplied to the gate terminal of the driving TFT DT from the constant current source Isrc. For example, in a driving TFT DT having a decreased threshold voltage Vth of about 0V, a value of threshold voltage Vth is increased to about 3V due to a constant current from the constant current source Isrc.

A "B" interval of FIG. 9 is defined as an interval between when an organic light emitting diode emits in one frame and when a negative bias voltage is applied. The "E" interval of FIG. 9 is defined as an interval between when the constant current from the constant current source Isrc is applied and when an organic light emitting diode emits in the next frame.

In this way, the organic light emitting diode display constantly maintains a threshold voltage of the driving TFT DT by periodically applying biases Vneg and Isrc. The timing of the applying signals S2 and S3 are set so that the compensation of a threshold voltage of the driving TFT DT by the negative bias applying signal S2 and the constant current applying signal S3 is accomplished within a blank interval, namely the interval between one frame and the next frame.

Figure 13:
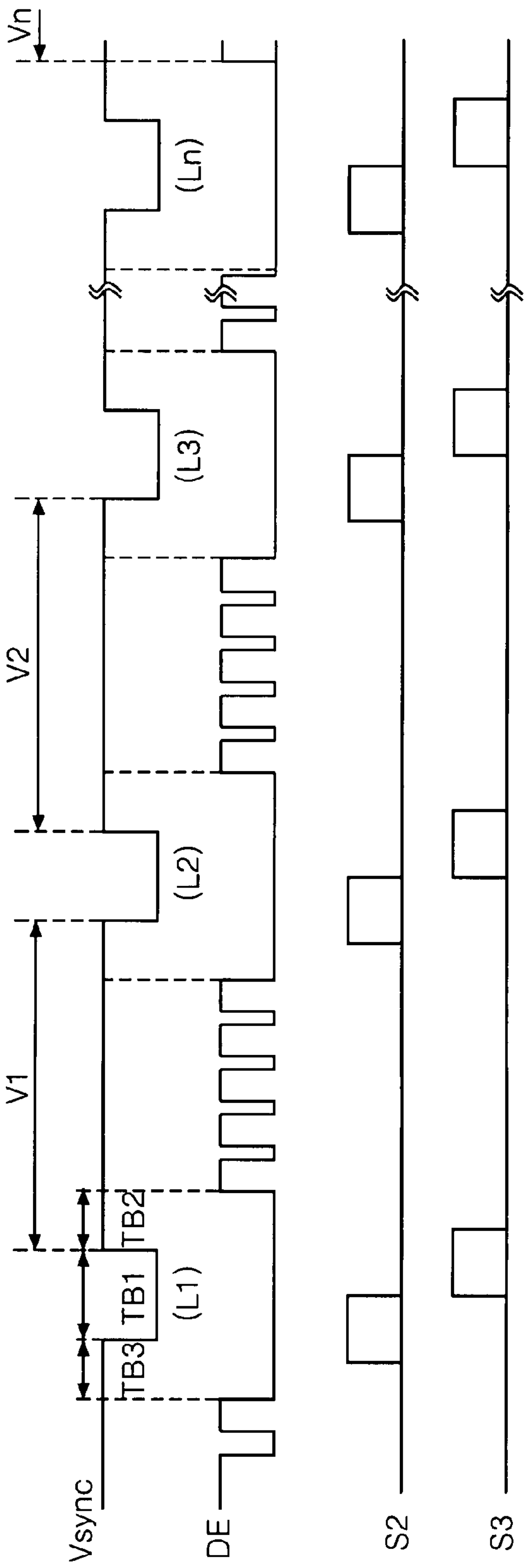
FIG. 13 is a timing diagram.

However, it is difficult for all pixels to be compensated simultaneously within one frame because of the limited time. The display device may be implemented to compensate pixels in one horizontal line for each frame. This will be described in detail with reference to FIG. 13. FIG. 13 is a timing diagram for explaining intervals and signals for compensating a threshold voltage of a driving TFT. FIG. 13, a blank interval includes a vertical synchronization signal width period TB1, a vertical back porch period TB2, and a vertical front porch period TB3. Herein, the vertical synchronization signal width period TB1 ranges from an end point of a prior vertical synchronization signal to a start point of a current vertical synchronization signal. The vertical back porch period TB2 ranges from a start point of a current vertical synchronization signal to just before a data enable signal DE for a first line of a screen within a current vertical synchronization signal. The vertical front porch period TB3 ranges from an end point of a data enable signal DE for the last line of a screen within a prior vertical synchronization signal to a start point of the vertical synchronization signal width period TB1.

The negative bias applying signal S2 and the constant current applying signal S3 are sequentially turned-on as a high level within the blank interval. Specially, the negative bias applying signal S2 and the constant current applying signal S3 are generated for one horizontal line selected among n horizontal lines within one frame by the timing controller 127. Accordingly, a threshold voltage of the driving TFTs DT is compensated by one horizontal line for one frame. As a result, threshold voltages of the driving transistors, which are located at the n horizontal lines corresponding to all the horizontal lines of one screen, are compensated for a plurality of blank periods.

On the other hand, the display device compensates threshold voltages of the driving TFTs DT which are located at one horizontal line for one frame. However, the display device is not limited to this configuration. In other words, when m×n light emitting cells and driving transistors are located for each pixel area between m data lines and 2n gate lines, the threshold voltage compensating circuit may compensate threshold voltages of the driving transistors. The driving transistors are located at k (k<n) horizontal lines arranged in the same direction as the gate lines for one blank period. The threshold voltages of driving transistors DT for all the n horizontal lines within one screen are compensated for a plurality of blank periods.

As described above, the organic light emitting diode display arbitrarily applies bias stress to a driving TFT to constantly maintain a threshold voltage, thereby improving display quality uniformity and solving the problem of residual images. As a result, the display quality is improved. Furthermore, the organic light emitting diode display maintains a threshold voltage of the driving TFT to prevent a degradation of a driving TFT, thereby preventing life span reduction of the display.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For example, a threshold voltage of the driving TFT DT is constantly maintained as a predetermined initial value when a threshold voltage of the driving TFT DT is increased by a positive gate-bias stress. On the other hand, even when a threshold voltage of the driving TFT DT is decreased by a negative gate-bias stress, the compensation of the threshold voltage of the driving TFT DT can be accomplished by changing a polarity of bias applied for the compensation. Accordingly, the scope of the invention shall be determined by the appended claims and their equivalents.

What is claimed is:

1. An organic light emitting diode display, comprising:

a light emitting cell connected between a high-level voltage source and a first node, wherein the light emitting cell is located in each of m×n pixel areas defined by m data lines and 2n gate lines;

a driving transistor connected between the first node and a ground voltage source to control a current flow in the light emitting cell, by using a voltage applied to a gate terminal of the driving transistor;

a data driving circuit configured to apply a data voltage of first polarity to the gate terminal of the driving transistor through the data lines to shift a threshold voltage of the driving transistor from a reference value to the voltage of first polarity; and a compensation circuit configured to supply a compensation voltage of second polarity, which is different from the first polarity, to the gate terminal of the driving transistor to shift the threshold voltage of the driving transistor from the voltage of first polarity to the voltage of second polarity, and supply a constant current to the gate terminal of the driving transistor to restore the threshold voltage of the driving transistor to the reference value, wherein output terminals of the data driving circuit and the compensation circuit are connected to the data lines, and wherein the compensation voltage is supplied to the gate terminal of the driving transistor through the data lines and then the constant current is supplied to the gate terminal of the driving transistor through the data lines.

2. The organic light emitting diode display according to claim 1, wherein the compensation circuit comprises:

a bias applying source that supplies the compensation voltage of second polarity, which is different from the first polarity, to the gate terminal of the driving transistor; and a constant current source that supplies the constant current to the gate terminal of the driving transistor.

3. The organic light emitting diode display according to claim 2, wherein the compensation circuit compares a voltage at the gate terminal of the driving transistor, which is changed as the constant current is supplied, with the reference value, and switches a current path between the constant current source and the gate terminal of the driving transistor in accordance with the comparison.

4. The organic light emitting diode display according to claim 3, wherein the compensation circuit restores threshold voltages of driving transistors located at k (k<n) horizontal lines for a blank period between two vertical synchronization periods, and restores threshold voltages of all driving transistors located at the n horizontal lines for a plurality of blank periods.

5. The organic light emitting diode display according to claim 4, wherein the pixel area comprises:

a first switch transistor connected between the data line and the gate terminal of the driving transistor to control the driving transistor; and a second switch transistor connected between the data line and the first node to short-circuit the gate terminal with a drain terminal of the driving transistor when the constant current is applied.

6. The organic light emitting diode display according to claim 5, wherein the gate line comprises:

a first gate line connected to a gate terminal of the first switch transistor; and a second gate line connected to a gate terminal of the second switch transistor.

7. The organic light emitting diode display according to claim 6, further comprises an emission transistor connected between the light emitting cell and a source terminal of the second switch transistor.

8. A method of driving an organic light emitting diode display, the display including a light emitting cell connected between a high-level voltage source and a first node, and a driving transistor connected between the first node and a ground voltage source to control current flow in the light emitting cell by using a voltage applied to a gate terminal of the driving transistor, wherein the light emitting cell is located in each of m×n pixel areas defined by m data lines and 2n gate lines, the method comprising:

applying a data voltage of first polarity to the gate terminal of the driving transistor to shift a threshold voltage of the driving transistor through the data lines from a reference value to the voltage of first polarity;

shifting the threshold voltage of the driving transistor from the voltage of first polarity to a voltage of second polarity by supplying a compensation voltage of second polarity different from the first polarity, to the gate terminal of the driving transistor; and restoring the threshold voltage of the driving transistor to the reference value by supplying a constant current to the gate terminal of the driving transistor from a constant current source, wherein the compensation voltage is supplied to the gate terminal of the driving transistor through the data lines and then the constant current is supplied to the gate terminal of the driving transistor through the data lines.

9. The method of driving the organic light emitting diode display according to claim 8, wherein restoring the threshold voltage includes:

comparing the gate terminal voltage of the driving transistor, which is changed according to the constant current, with the reference value; and switching a current path between the constant current source and the gate terminal of the driving transistor in accordance with the comparison.

10. The method of driving the organic light emitting diode display according to claim 9, wherein threshold voltages of the driving transistors located at k (k<n) horizontal lines within an entire pixel area which is defined by the data lines and the gate lines are restored for a blank period defined between two vertical synchronization periods, and the threshold voltage of all the driving transistors located at the n horizontal lines are restored for a plurality of the blank periods.

11. An organic light emitting diode display, comprising:

a light emitting cell connected between a high-level voltage source and a first node, wherein the light emitting cell is located in each of m×n pixel areas defined by m data lines and 2n gate lines;

a driving transistor connected between the first node and a ground voltage source to control a current flow at the light emitting cell, using a voltage applied to a gate terminal of the driving transistor;

a data driving circuit configured to apply a data voltage to the gate terminal of the driving transistor through the data lines to increase a threshold voltage of the driving transistor to a value greater than a reference value;

a compensation circuit configured to supply a compensation voltage, which is different from the data voltage, to the gate terminal of the driving transistor to reduce the threshold voltage of the driving transistor to a value less than the reference value, and supply a constant current to the gate terminal of the driving transistor to restore the threshold voltage of the driving transistor to the reference value, wherein output terminals of the data driving circuit and the compensation circuit are connected to the data lines, and wherein the compensation voltage is supplied to the gate terminal of the driving transistor through the data lines and then the constant current is supplied to the gate terminal of the driving transistor through the data lines.

* * * * *